Oct. 10, 1972  J. F. JAMMET  3,697,326
BATTERY INCLUDING PAIR OF AIR-DEPOLARIZED CELLS
Filed June 9, 1971  5 Sheets-Sheet 1
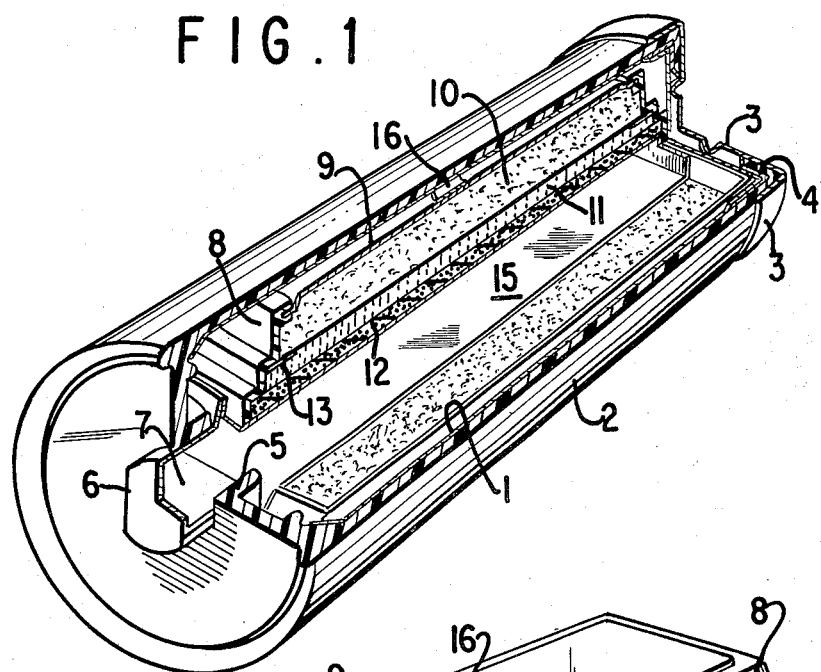
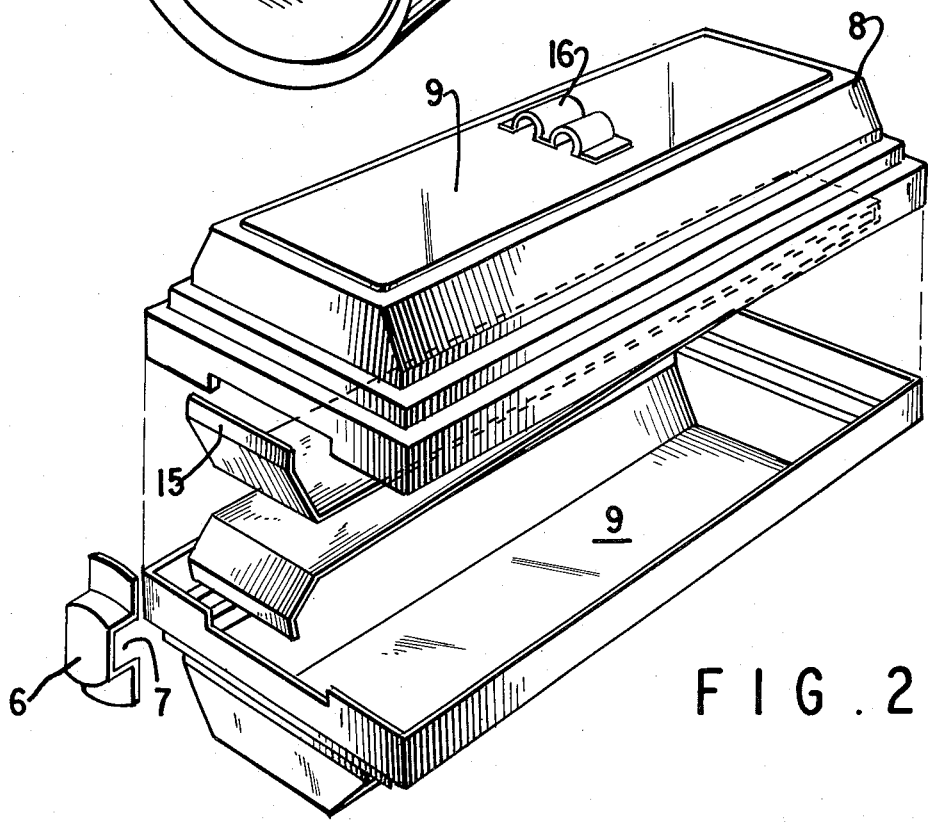
INVENTOR
JEAN FIRMIN JAMMET
BY
ATTORNEYS INVENTOR
JEAN FIRMIN JAMMET
BY
Kenyon & Kenyon Reilly Carr & Chapin
ATTORNEYS

INVENTOR
JEAN FIRMIN JAMMET

Oct. 10, 1972    J. F. JAMMET    3,697,326
BATTERY INCLUDING PAIR OF AIR-DEPOLARIZED CELLS
Filed June 9, 1971    5 Sheets-Sheet 4

INVENTOR
JEAN FIRMIN JAMMET
BY
Kenyon & Kenyon Reilly Carr & Chapin
ATTORNEYS

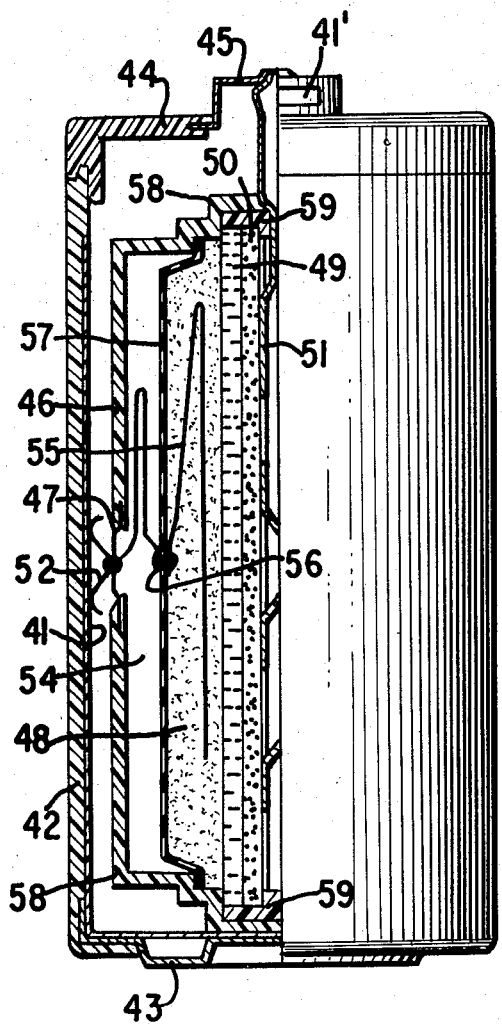
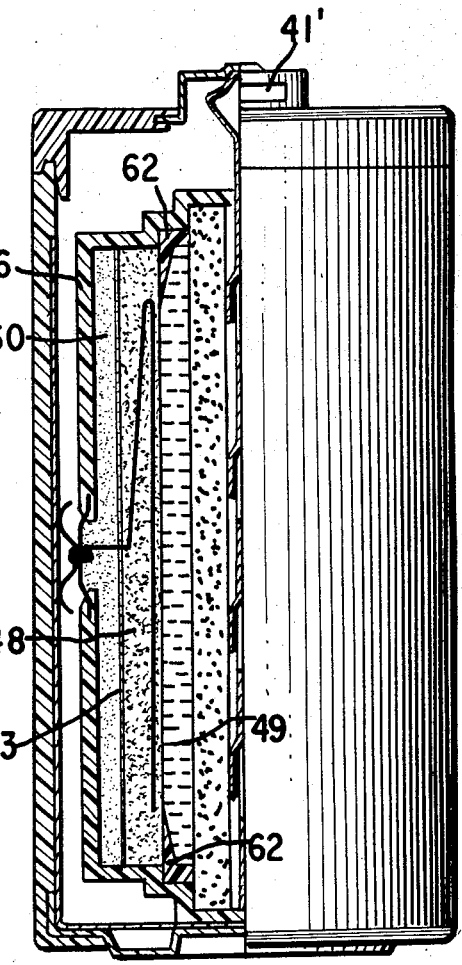

United States Patent Office 3,697,326
Patented Oct. 10, 1972

3,697,326
BATTERY INCLUDING PAIR OF AIR-DEPOLARIZED CELLS
Jean Firmin Jammet, Poitiers, France, assignor to Societe des Accumulateurs Fixes et de Traction (Societe Anonyme), Romainville, France
Filed June 9, 1971, Ser. No. 151,292
Claims priority, application France, June 8, 1970, 7020985; Oct. 29, 1970, 7039012
Int. Cl. H01m 29/04
U.S. Cl. 136—86 A   25 Claims

ABSTRACT OF THE DISCLOSURE

Primary electric battery comprising an outer metallic cup coated externally except at its bottom with a casing of synthetic material, the bottom constituting one terminal and a metallic cap in the cover of the casing constituting the other terminal. A pair of flat air depolarized cells connected in parallel are housed in the cup and embody main trays whose openings face each other and whose bottoms are parallel to the axis of the cup, each of the trays containing a negative electrode, an immobilized electrolyte preferably carried by a separator, and a positive electrode arranged in layers in each tray. The trays are separated by a space in communication with the exterior of the battery during its operation. The space is positioned preferably between the positive electrodes of the facing trays. The positive and negative electrodes of both trays are parallelly connected electrically respectively to the metallic cap and the metallic cup. Provision is made for expansion of the negative electrodes when the batteries are in use.

---

The invention concerns primary electric batteries, and more particularly those of the type comprising a container consisting of a metal cup preferably covered, except for at least the central part of its bottom, by a casing made of synthetic material, in which the terminals consist, on the one hand, of the bottom of the battery, on the other hand, of an upper central metal cap.

Primary batteries whose depolarizer mainly comprises manganese dioxide, in which the metal cup generally made of zinc and having a circular cross-section, forms the negative electrode can be cited as examples of such batteries.

It is known that in these batteries, the capacity is, in practice, limited by the quantity of depolarizer, this imposing a limited operating life.

One aim of the invention is more particularly to modify these batteries while keeping their outer dimensions, so as to increase their working life.

The object of the invention is a primary battery of the type composing a container formed by a metal cup, preferably covered except for at least the central part of its bottom, by a casing made of synthetic material, in which the terminals consist, on the one hand of an upper central metal cap and on the other hand of the bottom of the battery characterized in that it comprises at least two flat air depolarized cells, connected in parallel, housed in so-called main trays whose bottoms are substantially parallel to the axis of the cup, each of the cells comprising a negative electrode, an immobilized electrolyte, possibly carried by a separator, a positive electrode, a space in communication with the outside of the battery, at least during the operation of the latter, being arranged preferably between the positive electrodes of the cells, the positive and negative electrodes being electrically connected respectively to the metal cap and to the cup.

The flat cells essentially being air depolarized cells, the positive active material can take up a much smaller space than in the case of batteries in which the depolarizer substantially consists of manganese dioxide. Due to this fact, inside the battery, the space available for the negative active material is very much greater.

The capacity of the battery, becoming limited by that of the active material of the negative electrode, can be greatly increased by increasing the quantity of the latter, this becoming possible because of the increase in available space.

Moreover, the use of flat cells is suitable for the production of negative electrodes from powder material, this being an advantage for the proper operation of a greatly increased negative capacity.

According to one embodiment of the invention, the main trays are made of synthetic insulating material, except for at least part of their bottom, consisting of a conductive material, which is preferably metallic, means being provided for ensuring an electrical connection between the said conductive parts and the cup.

The said means may more particularly comprise spring blades, possibly fixed by welding to the conductive surfaces at the bottoms of the trays.

The negative electrodes may be in direct contact with the conductive parts of the main trays.

According to an embodiment of the invention, a current collector is fitted in the space provided between the positive electrodes, the said collector pressing upon the positive electrodes and being electrically connected to the metal cap.

This collector may consist of a metal blade folded back into a substantially U or V shape, the ends of the said blade being electrically connected to the lower part of the metal cap protruding in the battery.

The cup of the battery containing the flat cells may have a circular cross-section, but it may also have any other cross-section shape, for example a square shape.

The negative active material may be mainly made of zinc. It may be produced, e.g. from a paste consisting of divided zinc and gellified potassium hydroxide.

During discharge, the zinc of the negative electrode is progressively transformed into zinc oxides and hydroxides and this transformation is accompanied by a great increase in volume of the negative electrode, it being possible for this increase to reach about 60% in relation to the initial volume of the zinc.

This increase in volume of the negative electrode is liable to cause a deformation of the cup of the battery.

According to one characteristic of the present invention in order to obtain batteries capable of withstanding, without damage, the expansion of zinc during the electrochemical discharge reaction, in each main tray a space forming an expansion chamber for the negative active material is provided between the bottom of the said tray and the negative electrode.

According to a first embodiment, the negative electrode is arranged in a tray having a deformable wall, the said space being limited by the bottom of the main tray and the tray provided with a deformable wall.

The tray provided with a deformable wall may be of the bellows type.

It may also have elastically deformable walls.

According to another embodiment, a compressible material preferably provided with closed pores may be placed between the bottom of the main tray comprising the active components of the air depolarized cell, and the negative electrode.

Other characteristics of the invention will become apparent from the following description and attached drawing, in which:

FIG. 1 shows a perspective, partially cut-away view of an embodiment of a cylindrical battery according to the invention;

FIG. 2 diagrammatically shows a perspective view of an embodiment of the main trays intended for containing the flat cells, as well as the means of electrical connection relative to the electrodes;

Figure 8:
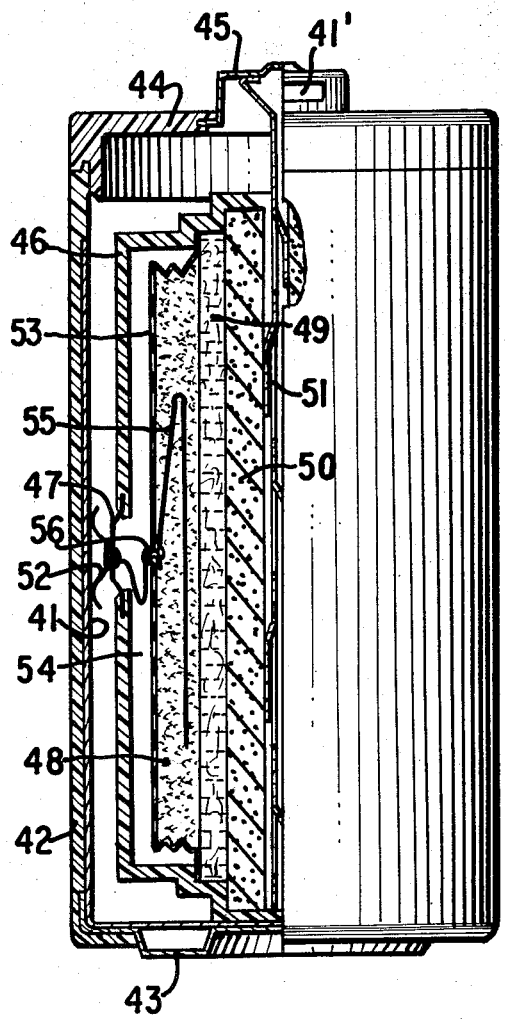

FIGS. 8, 9 and 10 respectively show half cut-away views of three other embodiments of batteries according to the invention.

In FIGS. 1 to 4, reference 1 designates a metal cup for example made of zinc, having a circular cross-section. This cup is covered, except on the central part of its bottom, with a casing 2, made of plastic material.

The lower part of the casing is held tight, in a way known in itself, between a metal sealing cup 3, pressing on the bottom of the cup 1 and a metal ring 4, having an L-shaped one half section. The metal sealing cup 3 may be provided with grooves as shown.

The casing 2 is provided at its upper central part with an inwardly extending tubular flange 5. This tubular bore is occluded by a metal cap 6, fitted in the tubular flange 5 as clearly appears in FIG. 3.

The edge of the part of the cap protruding inside the cell is folded back in a substantially perpendicular direction to its axis. The cap 6 is provided with lateral slots or holes 7 allowing the air to flow into the battery. The cap may be produced by stamping a metal sheet.

In the embodiment shown, the battery comprises two flat cells. These cells are fitted in the main trays 8 whose bottom are substantially parallel to the axis of the cup 2, These trays are made of synthetic insulating material, with the exception of a part 9 of their bottom, which is metallic.

The part of the tray which is made of insulating material may be molded upon the metal part 9.

The following components are successively placed in the trays:

A negative electrode 10, for example mainly made of amalgamated zinc powder;

An electrolyte 11, consisting for example of a potassium hydroxide solution immobilized in gellified flour.

A positive electrode 12, for example based on water-proofed active carbon with or without a collector grid.

A thin plastic frame 13 preventing the oxygen from freely passing between the tray and the edge of a separator and corroding the zinc, may be provided against the wall of the tray 8 made of insulating material, between the negative electrode 10 and the electrolyte containing separator 11.

The cathodes 12 of the two cells are spaced by an air gap 14, whose thickness can be from 2 to 4 mm. for example.

A current collector 15 consisting of a metal blade folded back in U or V shape, and whose legs, preferably forming a spring, are applied to the cathodes 12, is fitted in this gap. The ends of blade 15, preferably slightly folded back, are in contact with the metal cap 6.

Moreover, the electrical connection between the cup 1 and the metal parts 9 of the bottoms of the trays 8 is effected by means of flat metal springs 16, which can be welded to the said metal parts.

The main trays 8 are put in their places in such a way that their edges are applied against one another, a recess being provided for passing the end of the collector 15, this recess being also used so that the air flowing into the cell by means of the slots or holes 7 of the cap 6 can come into contact with the positive electrodes 12.

Figure 3:
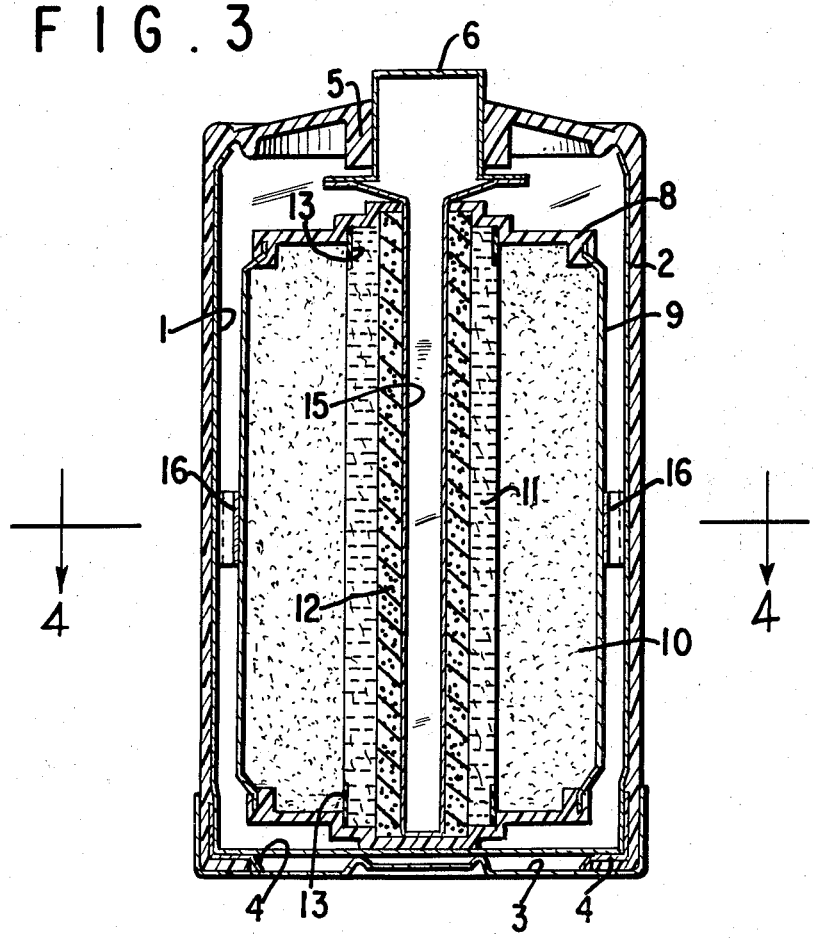
FIG. 3 is a vertically cross-sectional view of the battery in FIG. 1.
Figure 4:
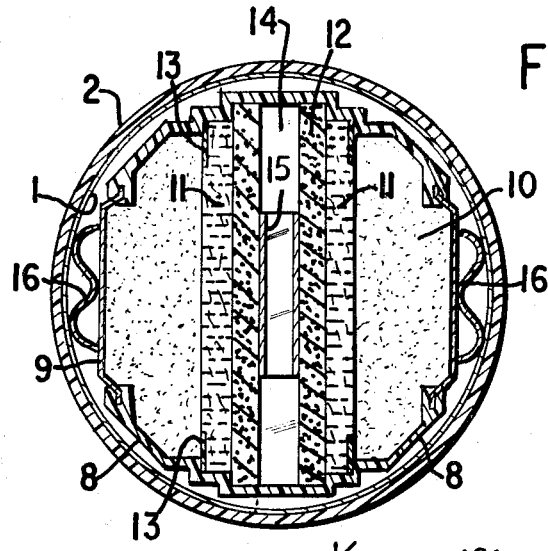
FIG. 4 is a horizontally cross-sectional view along line 4—4 of FIG. 3.
Figure 5:
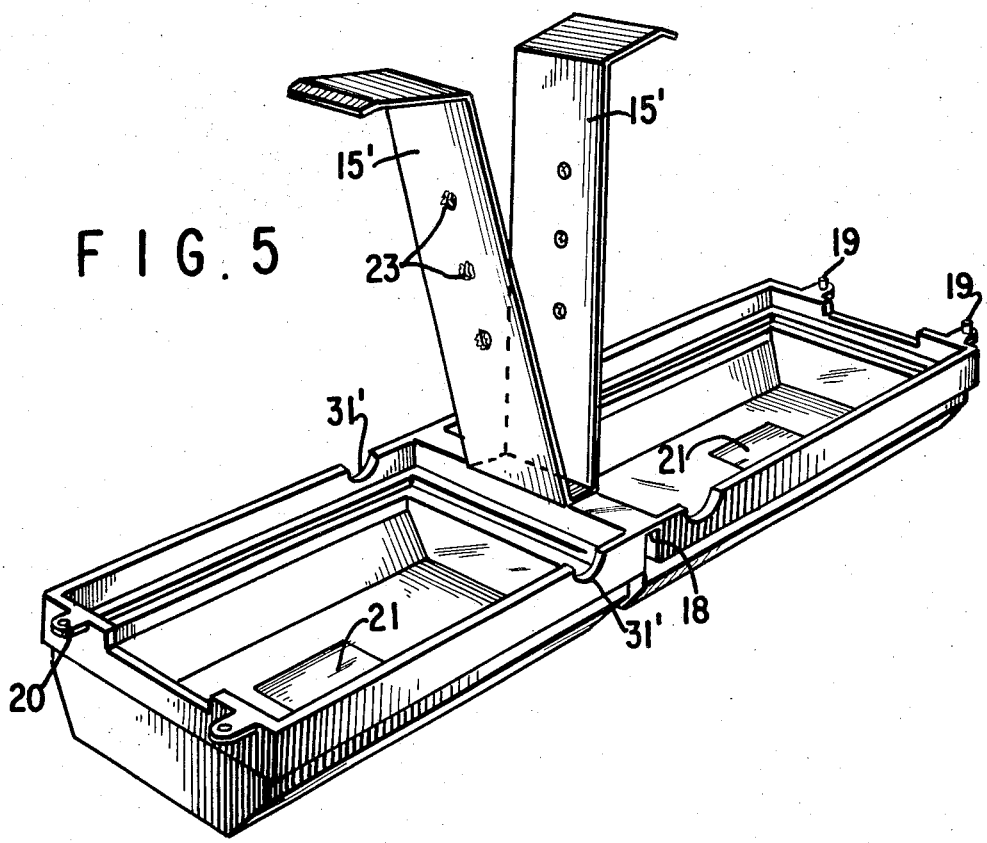
FIG. 5 shows a perspective view of another embodiment of the main trays intended for containing the flat cells.

FIG. 5 represents a perspective view of another embodiment of the trays intended for containing the flat cells. In this example, the trays 17 are connected together by one of their edges by means of a hinge 18.

Moreover, the trays are provided on edges other than those bearing the hinge 18 with means enabling them to be secured together after they have turned round hinge 18. For this purpose, one edge of the tray may bear conical studs 19 designed to engage in the appropriate holes 20 in the other tray.

The current collector 15' may, moreover, be secured to the trays 17, in the region of the hinge 18, for example by hot rivetting studs formed during the moulding of the trays through holes provided to this effect in collector 15.

The edges of the trays 17 may be provided with recesses 31' for enabling the air to circulate.

Figure 6:
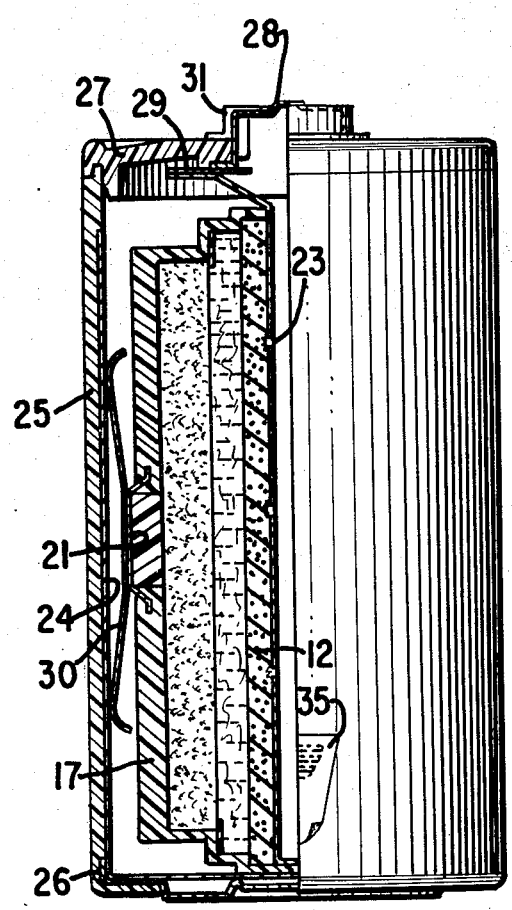
FIG. 6 shows a half cutaway view of an embodiment of a battery according to the invention using the trays shown in FIG. 5.

The bottoms of the trays are always provided with conductive parts 21 which, as can be seen in FIG. 6, may consist of a tough-shaped metal part, over which are molded the plastic parts of trays 17.

The current collector 15' may be provided, on its legs, with perforations for improving the contact with the cathodes 12.

In the embodiment shown in FIG. 6, the cup 24 can be produced in a known way either by impact extrusion or by cutting and shaping a metal sheet, the casing 25 being molded over it after placing a metal contact part 26 upon the bottom of the cup.

The molded casing 25 is closed by a suitable cover 27, which may be molded on cap 28 provided with slots or holes.

In the described example, the electrical contact between the ends of collector 15' and metal cap 28 is ensured by means of a metal disk 29 welded to the cap 28.

Moreover, the electrical contact between the cup 24 and the metal part 21 is ensured by means of a spring blade 30.

Figure 7:
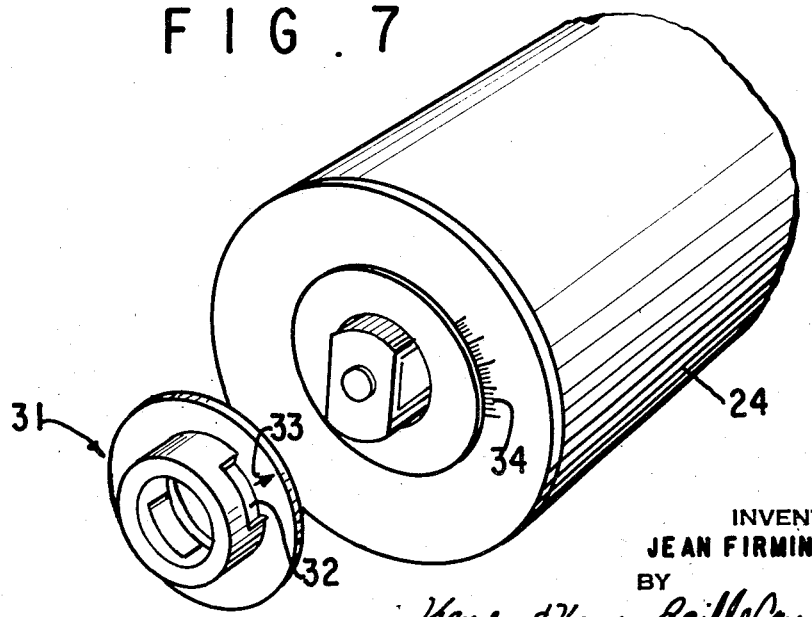
FIG. 7 shows a perspective view from above of a battery and means for regulating the rate of air flowing into the battery.

Means may be provided, according to the invention, for regulating the air flow into the battery through the slot(s) or hole(s) in the cap, these means preventing, more particularly the air from entering the cell during storage. These means may more particularly comprise a stopper made of insualting material, having slots or holes, which tightly fits over the cap. Reference 31 in FIG. 6 designates such a stopper, whose design can be better understood by referring to FIG. 7 which is a perspective view of a cell from above, the stopper being shown removed from the cap.

As can be seen, the stopper which fits over the cap and which can be given a rotary movement around the cap, is provided with slots or holes 32 corresponding to the slots or holes of the cap. It may also comprise an index 33, the top of the cell then comprising a graduation 34, thus regulating the air flowing into the cell more accurately.

In addition to the supply of air to the battery through the slots or holes in the cap, or instead of this supply system (and in the latter case the cap is without slots or holes), the cup and/or the casing may be perforated with vents provided with suitable closing means.

In FIG. 6, reference 35 designates a tongue connected with such a closing means. By pulling off the tongue 35, a vent can thus be opened, allowing the air to enter the cell. This tongue thus acts as a safeguard against premature use.

The vent thus opened may advantageously be placed not far from the holes formed by the recesses 31'.

FIGS. 8, 9 and 10 relates to embodiments in which a space forming an expansion chamber for the negative active material is provided in each main tray between the bottom of the said tray and the negative electrode.

In these figures, reference 41 designates a metal cup for example made of zinc having a circular cross-section; a casing 42 made of plastic material is molded over this cup after a metal contact part 43, such as shallow cup, has been secured to the bottom of the cup. The molded casing 42 leaves the central part of the bottom of the metal cup 43 free; moreover, the casing 42 is closed by a suitable cover 44 which may be molded on the metal cap 45.

This cap may be provided with lateral slots or holes 41' allowing the air to enter the cell.

In the embodiments shown, the cell comprises two flat air depolarized cells. These elements are fitted into so-called main trays 46 whose bottoms are substantially parallel to the axis of the cup 1. These trays 46 are made of a synthetic insulating material, with the exception of a part 47 of their bottom which is metallic. The part of the tray which is made of insulating material may be molded on the metal part.

Inside the trays 46 are placed successively:

A negative eletrode 48, mainly made e.g. of amalgamated zinc powder;

An electrolyte 49, consisting for example of a potassium hydroxide solution and immobilized by a gellified flour.

A positive electrode 50, mainly made e.g. of waterproofed active carbon, with or without a collecting grid.

The cathodes 50 of the two cells are spaced by an air gap whose thickness may be about 4 mm. for example; a current collector 51 resting on the cathodes is fitted in this gap. This collector may consist of a metal multi-contact spring blade as shown; it is, moreover, electrically connected with the cap 45 of the cell so that the latter forms the positive terminal.

The electrical connection between the metal parts 47 and the cup 37 is ensured by means of spring blades 52 which may be welded to the said metal parts 47. For clearness' sake, the space between the cup 37 and the main trays 46 has purposely been exaggerated in the drawing.

The trays 46 are placed in such a way that their edges are pressed together, a recess being provided for the end of collector 51, this recess being also used to allow the air entering the battery by means of the slots or holes 41' of the cover 45 to come into contact with the positive electrodes 50.

In the embodiment shown in FIG. 8, the negative electrode 48 is put, according to the invention, in a tray 53, so that between that tray 53 and the bottom of the main cup 46 there always remains a space 54 forming an expansion chamber. The tray 53, in the example shown is of the bellows type. During discharge, when zinc is expanding, it can thus be deformed and fill up the space 54. It may be made of polyvinyl chloride or the like.

The electrical connection between the negative electrode 48 and the metal part 47 is ensured by means of a slack wire 55 welded to the metal part 47; moreover, fluid-tight sealing at the level of the cup 53 by this wire 55 can be ensured by a drop of wax 56.

The embodiment shown in FIG. 9 mainly differs from that of FIG. 8 in that the bellows type tray 53 has been replaced by a tray 57 whose wall is elastically deformable.

The material of which this tray 57 is made may be an elastomer such as rubber, a polysiloxane or the like Moreover, in this embodiment, the immobilized electrolyte 49 and the positive electrode 50 are of equal dimensions and are held between a shoulder 58 of the tray 46 and a frame made of synthetic insulating material 59 whose aim is more thoroughly to prevent the oxygen entering between the cathodes from coming into contact with the anode active material.

In the embodiment shown in FIG. 10, a compressible material 60, preferably provided with closed pores, is arranged between the negative electrode 48 and the bottom of the main tray 46.

By way of an illustration which is in no way limitative, this material may be mainly made of polyurethane foam or the like.

During discharge, the volume of this material is reduced due to the expansion of zinc. It will also be noted that in the embodiment shown in FIG. 10, the edges of the immobilized electrolyte 49, are insulated from the tray 46 by a frame 62 made of insulating plastic material playing the same part as the frame 59 in FIG. 9.

In embodiments shown in FIGS. 9 and 10, the electrical connection between the negative electrode 48 and the metal part 47 is provided in the same way as in the case of FIG. 8.

In the embodiment shown in FIG. 10, the compressible material 60 may advantageously comprise a continuous film 63 on its face turned towards the negative electrode with a view to preventing the electrolyte from entering the compressible material. With the same aim in view, the compressible material may be coated with a layer of waterproof product.

Of course, the invention is in no way limited to the embodiments described and shown, which have been given by way of examples. More particularly, without going beyond the scope of the invention, details may be modified, certain arrangements may be changed or certain means may be replaced by equivalent means within the scope of the appended claims.

What is claimed is:

1. Battery of the type comprising a metallic cup container, a casing of synthetic material covering said cup except for a central portion of the bottom of said cup, an upper central metal cap for said cup constituting one terminal of said battery and the uncovered portion of the bottom of said cup constituting the other terminal of said battery, a pair of like flat air depolarized cells connected in parallel in said cup, each cell comprising main trays whose bottoms are substantially parallel to the axis of the cup, each of the cells comprising a negative electrode, an immobilized electrolyte and a positive electrode, said trays being positioned to provide a space between them communicating with the outside of the battery, at least during the operation of the latter, said space being arranged between the positive electrodes of the cells and means for connecting the positive and negative electrodes of each cell electrically respectively to the metal cap and to the cup.

2. A battery according to claim 1, wherein said cup is cylindrical and the said main trays are of synthetic insulating material except for at least a part of their bottoms which is of a conductive material, and means for ensuring an electrical connection between the said parts of conductive material and the cup.

3. A battery according to claim 2 wherein said last-named means comprise spring blades.

4. A battery according to claim 1, including a current collector positioned in the said space between the respective positive electrodes of said cells, the said collector pressing against the positive electrodes and being electrically connected to said metal cap.

5. A battery according to claim 4, wherein said collector comprises a metal blade folded over on itself to provide legs whose outer ends are electrically connected to an inwardly protruding part of said metal cap.

6. A battery according to claim 1, wherein each main tray includes a space forming an expansion chamber for the negative active material, said space lying between the bottom of each said main tray and the negative electrode therein.

7. A battery according to claim 6, including a tray having deformable walls and containing the negative electrode of the respective main tray, the said space being defined by the bottom of each such main tray and the tray therein having deformable walls.

8. A battery according to claim 7, wherein the tray having deformable walls is of the bellows type.

9. A battery according to claim 7 wherein the walls of each tray having deformable walls are elastically deformable.

10. A battery according to claim 6 including a compressible material with closed pores positioned between the bottom of each main tray and the negative electrode therein.

11. A battery according to claim 8 wherein each tray having deformable walls is of polyvinyl chloride.

12. A battery according to claim 9 wherein each tray having elastically deformable walls is made of an elastomer selected from the group consisting of rubber and a polysiloxane substance.

13. A battery according to claim 10 wherein said compressible material is mainly of foam polyurethane.

14. A battery according to claim 2 comprising electrical wires for effecting electrical connection between the negative electrode and the part of the bottom of the main tray which is of conductive material.

15. A battery according to claim 1 wherein said immobilized electrolyte and the positive electrode of each cell have the same dimensions and are held in position between a shoulder of the main tray containing them and a frame made of synthetic insulating material.

16. A battery according to claim 1 including a frame of plastic insulating material for insulating edges of the immobilized electrolyte in each main tray from such tray.

17. A battery according to claim 1 wherein said cup has a circular cross-section.

18. A battery according to claim 1 wherein facing edges of the two main trays abut at least partially against one another.

19. A battery according to claim 18 wherein the two main trays are connected together along one of their edges.

20. A battery according to claim 19 including means at another of their edges other than those bearing the hinge for attaching said another of their edges together.

21. A battery according to claim 19 including the metal blade folded into a V shape and acting as a current collector fixed to the said trays at the region of the said hinge.

22. A battery according to claim 1 wherein said cap has openings to permit air to flow into the cells.

23. A battery according to claim 22 including means for regulating the air flowing into the cells through the openings in the said cap and means to prevent air from entering the battery via the openings in the cap prior to time of use.

24. A battery according to claim 23 wherein said last-named means comprise a stopper made of insulating material and which tightly fits over the cap and has openings normally out of registry with the openings in said cap which may be moved into registry therewith to admit entry of air into the battery at time of use.

25. A battery according to claim 1, including ventilation openings therein and removable closing means for said openings to permit air to enter the cells and come into contact with the positive electrodes upon removal of the said closing means.

References Cited
UNITED STATES PATENTS

| | | | |
|---|---|---|---|
| 720,592 | 2/1903 | Kohn | 136—136 |
| 1,452,230 | 4/1923 | Wells | 136—136 |
| 1,899,615 | 2/1933 | Heise | 136—86 AUX |
| 2,213,429 | 9/1940 | Heise et al. | 136—136 |
| 2,797,254 | 6/1957 | Schumacher et al. | 136—136 X |
| 2,938,064 | 5/1960 | Rordesch | 136—86 A |
| 3,378,406 | 4/1968 | Rosansky | 136—86 A |
| 3,632,449 | 1/1972 | Yardney et al. | 136—86 A |

ALLEN B. CURTIS, Primary Examiner